United States Patent [19]

Crate

[11] 4,363,590
[45] Dec. 14, 1982

[54] POWER OPERATED BOAT LOADING/UNLOADING MARINE TRAILER

[76] Inventor: Barry T. Crate, 253 Queensway South, Keswick, Ontario, Canada, L4P 2B2

[21] Appl. No.: 190,997

[22] Filed: Sep. 26, 1980

Related U.S. Application Data

[63] Continuation-in-part of Ser. No. 78,776, Sep. 25, 1979, abandoned.

[51] Int. Cl.³ .............................................. B60P 1/00
[52] U.S. Cl. ................................ 414/518; 280/414.1; 414/530
[58] Field of Search ..................... 414/518, 529–536, 414/538, 559; 280/414 R; 9/1.2

[56] References Cited

U.S. PATENT DOCUMENTS 1,597,094  8/1926  Manly ................................. 414/530
2,936,915  5/1960  Marsh ................................. 414/538
3,155,249 11/1964  Johnson .............................. 414/534

Primary Examiner—John J. Love
Assistant Examiner—L. E. Williams
Attorney, Agent, or Firm—Zalkind & Shuster

[57] ABSTRACT

A boat is supported on a wheeled trailer frame by idler rollers and by powered rollers, of a self-adjusting type, located adjacent the rear end of the trailer frame from which the boat is loaded or unloaded. The powered rollers are driven by drive motors through self-locking gears to effect loading or unloading. The boat is held in a transport position on the trailer frame by the powered rollers through the self-locking gearing when the drive motors are de-energized.

13 Claims, 8 Drawing Figures

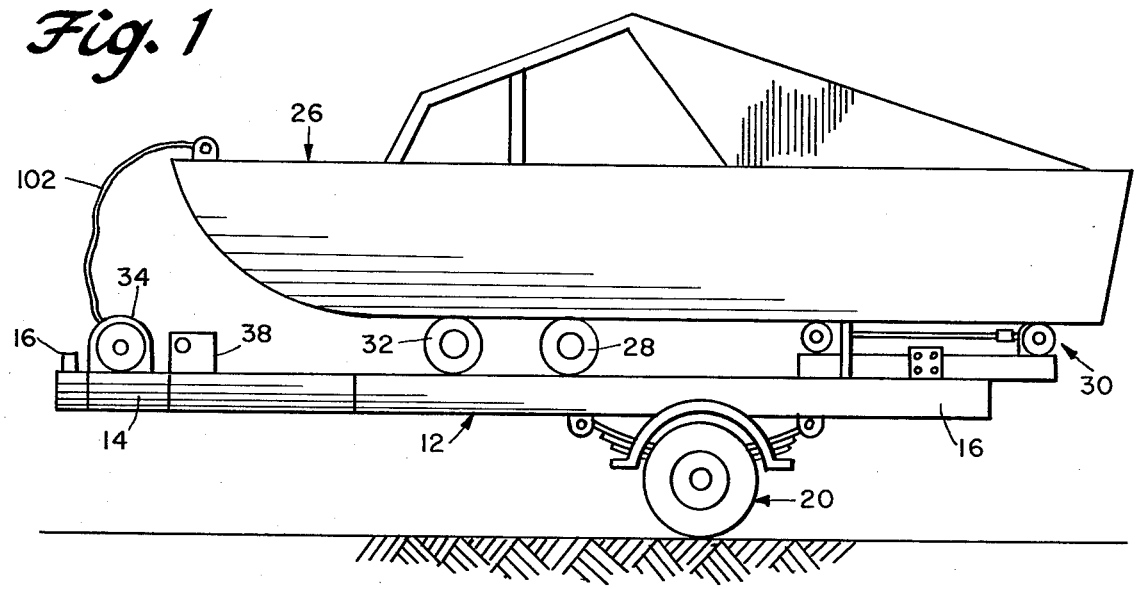
Fig. 1
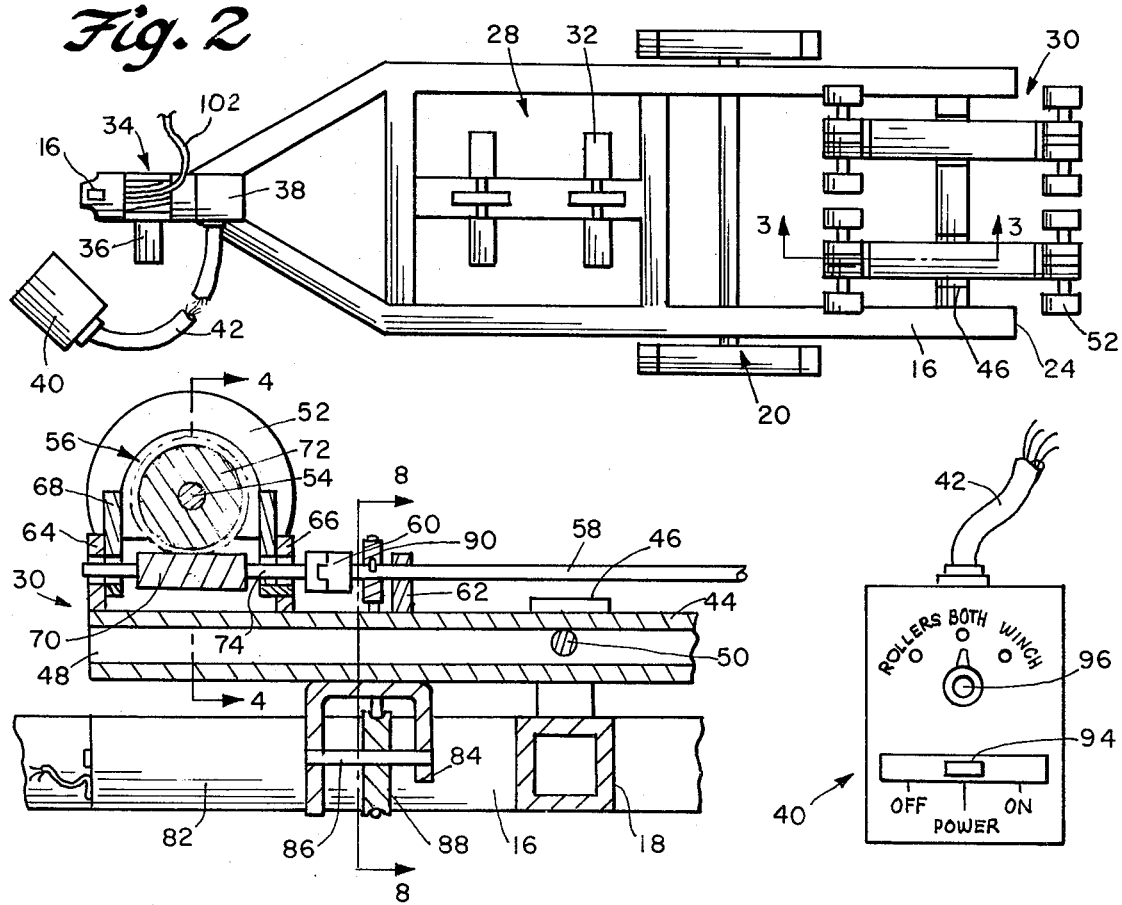
Fig. 2
Fig. 3
Fig. 5

POWER OPERATED BOAT LOADING/UNLOADING MARINE TRAILER

BACKGROUND OF THE INVENTION

This invention relates to power operated, boat loading and unloading trailers including improvements to the marine trailer disclosed in my prior copending application, Ser. No. 78,776, filed Sept. 25, 1979, now abandoned, with respect to which the present application is a continuation-in-part.

The use of wheeled trailers hitched to a towing vehicle for hauling of boats to and from launching sites is well known, as disclosed for example in U.S. Pat. Nos. 2,936,915 and 3,155,249 to Marsh and Johnson, respectively. The power operated type of boat trailer as shown by way of example in the Marsh patent, features a powered cable winch mounted adjacent the forward end portion of the trailer frame. Loading and unloading of boats by such power operating equipment has been found to be unsatisfactory. The power operated winch is sometimes useless during the boat unloading operation which is a major problem with such boat hauling trailers. Further, displacement of the boat onto the trailer by means of a power operated cable winch exerts unevenly distributed stresses on the boat sometimes resulting in rupture of parts from high stress concentrations. Also, with powered winch types of boat trailers, additional facilities must be provided to hold the boat secure to prevent shift during transport.

Both hauling trailers of the nonpowered type, utilizing only idler rollers for guiding movement of the boat on the trailer frame during loading and unloading operations is also well known as disclosed, for example, in the Johnson patent aforementioned. In this type of boat trailer, idler rollers are exclusively utilized including some of the self-adjusting type. The power for pulling the boat onto the trailer according to the Johnson patent is derived from a manually operated cable winch mounted on a post adjacent the forward end of the trailer frame as in the case of the Marsh patent aforementioned.

The powering of fixedly mounted rollers to form a conveyor on a truck bed is already known, as disclosed in U.S. Pat. No. 1,597,094 to Manly. However, power for loading boats onto a trailer has only been applied heretofore to the front end mounted cable winch of boat trailers.

It is therefore an important object of the present invention to provide a power operated type of boat trailer through which loading and unloading of a boat may be effected more rapidly and with less physical effort on the part of the boat handler. An additional object in accordance with the foregoing object is to provide a boat trailer capable of effecting powered loading and unloading of boats of different types and shapes.

Yet another object of the present invention is to provide a power operated boat loading and unloading trailer that avoids the problems associated with cable winch types of boat trailers as aforementioned.

A still further object of the present invention is to provide a power operated boat trailer of relatively low cost on which boats may be readily locked in a stationary position in a secure manner to prevent dangerous shifting during transport.

SUMMARY OF THE INVENTION

In accordance with the present invention, a wheeled boat trailer frame, of a generally well known type having a power operated cable winch mounted at its front end portion, is provided with idler rollers rotatable about fixed axes perpendicular to the longitudinal axis of the trailer frame and located intermediate the front and rear end portions of the trailer frame. A pair of self-adjusting roller assemblies are mounted in laterally spaced relationship to each other adjacent the rear end portion of the trailer frame. The self-adjusting roller assemblies not only establish contact with the hull or keel of a boat being loaded onto or unloaded from the trailer at the rear end portion, but are also powered in order to effect displacement of the boat to a stable transport position on the trailer. The power operated cable winch is utilized only to pull the boat toward the trailer into contact with the powered roller assemblies at the rear end portion of the trailer. A remote control unit powered by a battery mounted adjacent the front end portion of the trailer frame enables the boat handler to selectively control operation of the powered roller assemblies and the power operated cable winch.

Each of the powered roller assemblies includes a reversible drive motor that is coupled through self-locking gearing units to the powered rollers for drive thereof in opposite directions. Such self-locking gear units are associated with two pairs of rollers rotatably mounted adjacent opposite ends of an elongated tubular support associated with each powered roller assembly. A power shaft couples the drive motor to both gear units and is mounted by the tubular support for rotation about an adjustment axis perpendicular to the movable rotational axes about which the rollers are driven at opposite ends of the tubular support.

By means of the power control unit aforementioned, the two drive motors respectively associated with the two powered roller assemblies are energized from the battery for rotation in one direction or the other depending on the setting of a three-position directional control switch. In the power off position of the directional control switch, the power driven rollers are locked by the self-locking gear units in order to firmly hold the boat in its transport position preventing shift during travel of the trailer. A second three-position selector switch associated with the power control unit enables the boat handler to separately energize either the two powered roller assemblies or the cable winch or to simultaneously energize both the powered roller assemblies and the cable winch. Thus, through use of the remote control power unit, the boat handler may readily draw a boat into contact with the powered roller assemblies at the rear end of the boat trailer and once the boat is in engagement therewith, the cable winch may be de-energized and the powered roller assemblies energized to advance the boat to its transport position on the trailer frame. For unloading the boat, the powered roller assemblies are operated in a reverse direction.

BRIEF DESCRIPTION OF DRAWING FIGURES

The invention will be subsequently described in greater detail with reference to the accompanying drawings, in which:

FIG. 1 is a side elevation view of a boat trailer constructed in accordance with the present invention with a boat loaded thereon.

FIG. 2 is a top plan view of the boat trailer shown in FIG. 1 without any boat thereon.

FIG. 3 is an enlarged partial section view taken substantially through a plane indicated by section line 3—3 in FIG. 2.

FIG. 5 is an enlarged top plan view of the remote power control unit associated with the present invention.

DETAILED DESCRIPTION OF PREFERRED EMBODIMENTS

Figure 4:
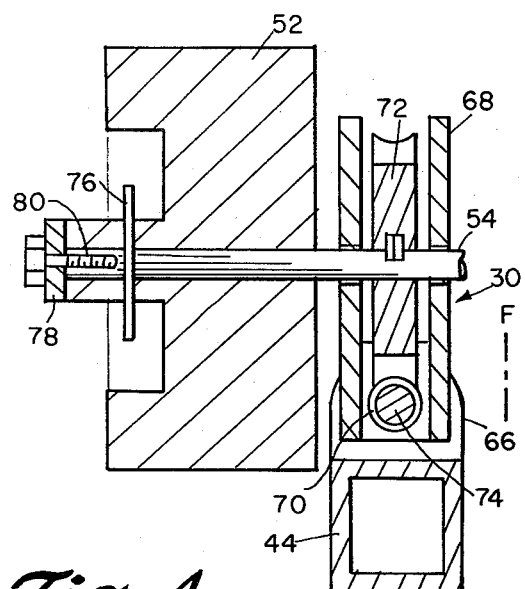
FIG. 4 is a partial transverse section view taken substantially through a plane indicated by section line 4—4 in FIG. 3.

Referring now to the drawings in detail, FIGS. 1 and 2 illustrate a boat hauling trailer generally referred to by reference numeral 10 with which the present invention is associated. The basic trailer construction may be of a well known commercially available type which includes a longitudinally elongated trailer frame 12 having a front end portion 14 mounting a hitch coupler 16 adapted to couple the trailer frame to a towing vehicle. The frame diverges from the front end portion toward a pair of laterally spaced, elongated frame members 16 interconnected at longitudinally spaced docations by cross frame members 18. The trailer frame is supported by a pair of spring suspended wheel assemblies 20 interconnected by an axle 22. As is well known in the art, a boat 26 is adapted to be loaded onto or unloaded from the trailer frame 12 at its rear end 24 and is supported on the trailer frame in a transport position as shown in FIG. 1.

With continued reference to FIGS. 1 and 2, it will be observed that the boat is stabilized in its transport position on the trailer frame by idler roller assemblies 28 located intermediate the front and rear end portions of the frame and by two laterally spaced powered roller assemblies 30 adjacent the rear end portion 24. The idler roller assemblies 28 include roller element 32 that are rotatable about axes fixed to the trailer frame parallel to each other and perpendicular to the longitudinal axis of the trailer frame. Accordingly, the idler rollers will rollingly guide the movement of the boat as it approaches or departs from its transport position. The powered roller assemblies 30, on the other hand, are pivotally mounted for self-adjustment purposes adjacent the rear end portion of the trailer frame in order to effectively engage and guide the boats of different shapes during loading and unloading.

Mounted adjacent the front end portion 14 of the trailer frame, just rearwardly of the hitch coupler 16, is a power-operated cable winch 34 having an electric drive motor 36 associated therewith. Also mounted adjacent the power operated winch on the trailer frame is a protective enclosure 38 for a battery and associated power circuit, to be described in detail hereinafter. A remote power control unit 40 is connected to the battery and power circuit through an elongated power cable 42, so as to enable a boat handler to control operation of both the powered roller assemblies 30 and the power operated winch 34.

Figure 7:
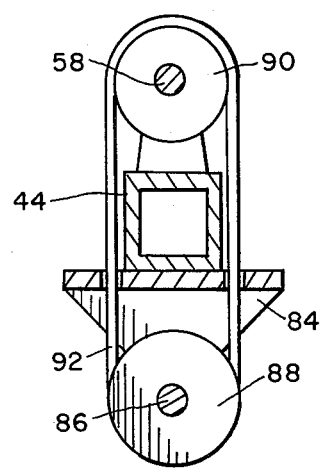
FIG. 7 is a partial section view taken substantially through a plane indicated by section line 7—7 in FIG. 3.

Referring now to FIGS. 3, 4 and 7, in particular, the details of one of the powered roller assemblies 30 are shown. Each of the powered roller assemblies are similar in construction and operation so that only one of such roller assemblies will be described. Each powered roller assembly includes an elongated tubular support 44 pivotally mounted by pivot assemblies 46 on a cross frame member 18 intermediate opposite ends 48 of the tubular support. The tubular support is thereby pivotally displaceable about a pivotal axis extending through pivot shaft 50, as more clearly seen in FIG. 3, extending perpendicular to the longitudinal axis of the trailer frame. The pivotal axes of both roller assemblies 30 are adapted to be axially aligned. One axial end 48 of the tubular support is spaced forwardly of the rear end 24 of the trailer frame, while the opposite axial end projects rearwardly beyond the trailer frame, as shown in FIG. 2. As also shown in FIG. 2, a pair of powered rollers 52 is supported adjacent each axial end of each of the tubular supports.

Referring now to FIGS. 3 and 4 in particular, each pair of rollers 52 is interconnected by a driven shaft 54. The driven shafts 54 mounted adjacent the opposite axial ends of the tubular support 44 are drivingly interconnected with each other through self-locking gear units 56 and by power coupling means including an elongated power shaft 58 interconnected at opposite axial ends with the gear units 56 through shaft couplings 60. The power shaft 58 in the disclosed embodiment is rotatably supported by bearings 62 externally of the tubular support 44 for rotation about adjustment axes parallel to the longitudinal axis of the trailer frame or tubular support. The driven shafts 54, on the other hand, are drivingly connected to the power shaft 58 through the gear units 56 for rotation about rotational axes perpendicular to the adjustment axes. Each gear unit and associated driven shaft 54 is furthermore supported for angular displacement about an adjustment axis by means of spaced pivot brackets 64 and 66 fixed to the tubular support adjacent its axial end. The pivot brackets 64 and 66 thereby pivotally support a gear frame 68 angularly adjustable about the adjustment axis along which the power shaft 58 extends. Each of the gear units includes meshing gear elements such as worm gear 70 connected by gear shaft section 74 to the shaft coupling 60 and worm wheel 72 splined to the driven shaft 54. The pitch of the worm gears 70 and 72 is such as to make them self-locking when no power is applied to the worm gear 70 from the power shaft 58. Alternatively, other meshing gear elements may be utilized, in which case a drive-release brake device would be provided for the driven shaft 54. Thus, when no power or torque is applied to shaft 54 for rotation of the powered rollers 52, the powered rollers will be locked stationary with the driven shaft 54 in order to firmly hold the boat supported in contact therewith in its transport position.

As more clearly seen in FIG. 4, each of the powered rollers 52 is keyed to the end portion of the driven shaft 54 by a cotter pin 76 and is held axially assembled on the driven shaft by a washer 78 fastened to the end of the driven shaft by a screw fastener 80. Thus, the powered roller 52 may be readily disassembled from the driven shaft for repair or replacement purposes and may also be rotationally disconnected from the driven shaft without disassembly by simply withdrawing the cotter pin 76.

Power for rotation of the powered rollers 52 is derived from an electric drive motor 82 associated with each of the powered roller assemblies 30, as more clearly seen in FIG. 3. A support bracket 84 is secured as by welding to the underside of the tubular support 44 adjacent one axial end and carries the drive motor 82 from which a motor shaft 86 extends through the support bracket, generally parallel to the longitudinal axis of the tubular support. A drive sprocket 88 is secured to the motor shaft below the tubular support in axial alignment with a driven sprocket wheel 90 keyed to the power shaft 58 above the tubular support 44. As more clearly seen in FIG. 7, the drive and driven sprockets are interengaged by an endless sprocket chain 92 so that energization of the drive motor 82 will be effective to transmit power through the power shaft 58 and gear units 56 to all of the four powered rollers 52 associated with each powered roller assembly. The drive motors 82 are of the reversible type so as to enable the powered rollers 52 to advance a boat engaged therewith in a loading direction as well as to displace a boat in a reverse unloading direction.

Control over the drive motors 82 associated with the powered roller assemblies 30 and the drive motor 36 associated with the powered cable winch 34 is exercised by the boat handler through the remote power control unit 40, as aforementioned. As more clearly seen in FIG. 5, the remote power control unit 40 may be held in the hand of the boat handler and is provided with a three-position directional power switch 94 having a power-off position and boat loading and unloading positions on opposite sides thereof. A second three-position selector switch 96 is provided through which the powered roller assemblies 30 and the powered cable winch 34 are either separately energized or simultaneously energized.

Figure 6:
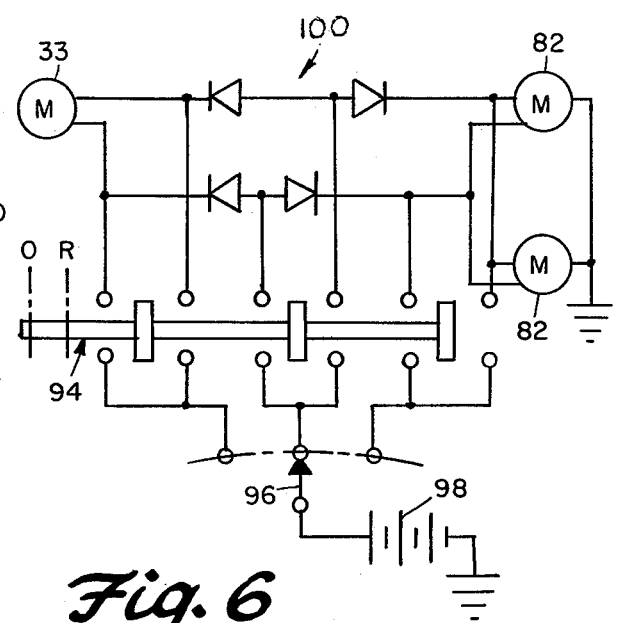
FIG. 6 is an electrical circuit diagram corresponding to the electrical control system associated with the present invention.

Referring now to FIG. 6, a battery 98 and power control circuit 100 associated therewith, enclosed within the power box 38, are shown by way of example. The power terminal of the battery is connected to the selector switch 96 connected in series with the power directional switch 94 to the drive motors 82 and 36. In the intermediate off position of the power switch 94, no circuit is completed through any of the drive motors. When the switch 94 is displaced against a spring bias in opposite directions to its other operative positions, the drive motors are energized for rotation in one direction or the other. The selector switch 96 displaceable from a detent held position determines which of the drive motors are energized under control of the power switch 94. Thus, the boat handler is able to selectively and directionally control energization of the drive motors 82 and 36 in order to effect loading and unloading of a boat.

The powered winch assembly 34 is utilized only to pull the boat toward the trailer by its cable 102 coupled to the front end of the boat, as shown in FIG. 1. As soon as the boat is pulled into contact with the powered roller assemblies 30, the winch motor 36 may be deenergized and the powered rollers 30 energized to begin a loading operation. Since the powered rollers 52 are displaceable about perpendicular axes they are self-adjusting and will effectively establish continuous multiple roller contact with boats of different shapes and sizes so that when the powered roller assemblies are energized, the boat will be positively advanced toward the transport position. The power switch 94 is spring biased to its intermediate off position in order to avoid unintentional movement of the boat. The selector switch 96, on the other hand, will be yieldably held by a suitable detent in any one of its three operative positions to which it is displaced.

Figure 8:
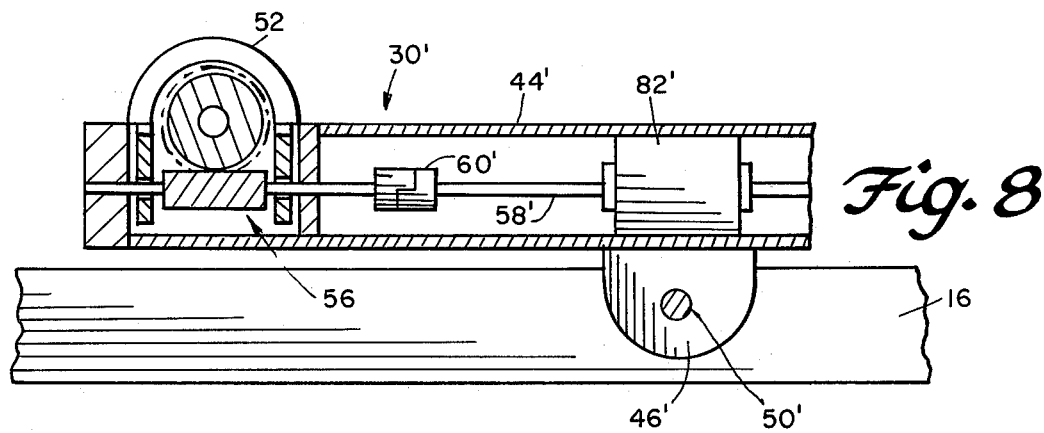
FIG. 8 is a partial section view similar to that of FIG. 3, but showing a modification of the embodiment illustrated in FIGS. 1-4.

FIG. 8 illustrates a modification in the powered roller assembly. Instead of the power coupling shaft 58 being rotatably mounted externally of the tubular support 44 and drivingly connected to the drive motor through sprocket gearing, a direct drive connection is established to a drive motor 82' mounted internally and centrally within a modified form of tubular support 44'. The tubular support 44' is pivotally mounted on the trailer frame by means of a pivot bracket 46' through which a pivot shaft 50' extends closely spaced below the tubular support 44'. The motor shaft for the drive motor 82' constitutes the power coupling shaft 58' connected by shaft couplings 60' at opposite ends to the gear units 56. The mounting of the gear units 56 and its functional relationship to the powered rollers 52 is the same as hereinbefore described with respect to the powered roller assemblies 30 shown in FIGS. 3 and 4. Spaced bearing assemblies 104 and 106 fixed to the tubular shaft journal the gear shaft section 74 and seal the drive motor 82' within the tubular support.

What is claimed is:

1. A marine trailer, comprising a frame having a front end portion, an intermediate portion and a rear end portion, idler rollers carried by said frame on the intermediate portion thereof, powered roller means carried by the frame on the rear end portion thereof, means for driving said powered roller means to load a boat on the trailer, said powered roller means including two laterally spaced roller assemblies pivotally mounted on the frame, each of said roller assemblies including an elongated support having opposite ends, a pair of rollers rotatably mounted on the support adjacent each of said opposite ends, means pivotally mounting each of the supports on the frame intermediate said opposite ends, said driving means including a drive motor associated with each of said roller assemblies, gear means drivingly connecting each of the said drive motors to the pairs of rollers of each of the roller assemblies, a battery mounted on the frame, and power circuit means operatively connecting the battery to said drive motors for controlling energization thereof to load or unload the boat, said power circuit means including a hand held control unit.

2. The combination of claim 1 including a power driven winch mounted on the frame at the front end portion thereof, an electric motor drivingly connected to said winch, and means connecting the electric motor to the power circuit means for controlling energization thereof by the battery under control of the hand held control unit.

3. The combination of claim 1 wherein each of said supports associated with the roller assemblies includes an elongated tube within which one of the drive motors is mounted, and seal means for protectively enclosing the drive motors within the tubes.

4. A boat loading and unloading trailer comprising a wheeled frame having a front end portion and a rear end portion spaced along a longitudinal axis, powered roller means mounted on the frame adjacent the rear end portion for engaging a boat being loaded or unloaded, idler roller means mounted on the frame in spaced relation to the powered roller means intermediate the front and rear end portions for contact with the boat, and power control means operatively connected to the powered roller means for remotely controlling loading and unloading of the boat, said powered roller means including a pair of roller assemblies mounted on the frame in laterally spaced relationship to each other, each of said roller assemblies including an elongated support having opposite ends, a pair of rollers rotatably mounted on the support adjacent each of said ends, driven shaft means interconnecting each of said rollers for rotation about parallel rotational axes perpendicular to the longitudinal axis of the frame, pivot means mounting each of the elongated supports for pivotal displacement about pivotal axes parallel to the rotational axes of the driven shaft means, bearing means mounted on each of the elongated supports adjacent said opposite ends thereof for adjustably supporting the driven shaft means to accommodate lateral angular displacement of the rotational axes about adjustment axes parallel to the longitudinal axis of the frame, power input means drivingly connected to the driven shaft means and mounted by said bearing means for rotation about said adjustment axes, a pair of drive motors respectively associated with said roller assemblies, means drivingly connecting the respective drive motors to the power input means associated with each of said roller assemblies, a source of electrical energy, and remotely controlled power circuit means operatively connecting said source to each of the drive motors for controlling powered operation of the roller assemblies.

5. The combination of claim 4 wherein each of said supports comprises a rigid tube.

6. The combination of claim 5 wherein said power input means includes a power shaft rotatably mounted within the tube and self-locking gear means drivingly connecting the power shaft to the driven shafts.

7. The combination of claim 6 wherein the drive motors are respectively mounted within the tubes associated with the roller assemblies and connected to the power shaft.

8. The combination of claim 4 wherein said power input means comprises a power shaft rotatably mounted externally of the tube, said drive motors being mounted on the tube, and self-locking gear means drivingly connecting the driven shafts to the power shaft.

9. In combination with a self-adjusting roller assembly mounted adjacent the rear end of a boat transporting trailer, including a support having opposite ends, means pivotally mounting the support on the trailer about a pivotal axis, a pair of rollers adjacent each of said opposite ends of the support and bearing means rotatably mounting each pair of said rollers for rotation about rotational axes parallel to the pivotal axis and angular displacement about an adjustment axis perpendicular to said rotational axes, the improvement residing in power operated means for imparting rotation to the rollers, comprising a drive motor mounted by the support, self-locking gear means angularly displaceable with the rollers about said adjustment axis for transmitting torque thereto, and power coupling means for transmitting torque from the drive motor to the gear means.

10. The improvement as defined in claim 9 wherein said power coupling means includes a power shaft rotatable about said adjustment axis externally of the support.

11. The improvement as defined in claim 9 wherein said support comprises a longitudinally elongated tube.

12. The improvement as defined in claim 11 wherein said power coupling means includes a power shaft rotatable about said adjustment axis within the tube, said drive motor being connected to the power shaft within the tube and sealed therein by the bearing means.

13. The combination of claim 9 including idler roller means mounted on the trailer for rotation about fixed axes parallel to said pivotal axis for rotation in spaced relation to the roller assembly.

* * * * *